(12) United States Patent
Suzuki

(10) Patent No.: US 12,337,395 B2
(45) Date of Patent: Jun. 24, 2025

(54) SHANK AND CUTTING TOOL HAVING THE SHANK

(71) Applicant: TUNGALOY CORPORATION, Fukushima (JP)

(72) Inventor: Yusuke Suzuki, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 104 days.

(21) Appl. No.: 18/338,983

(22) Filed: Jun. 21, 2023

(65) Prior Publication Data

US 2023/0415240 A1 Dec. 28, 2023

(30) Foreign Application Priority Data

Jun. 22, 2022 (JP) .................. 2022-099986

(51) Int. Cl.
*B23B 29/32* (2006.01)

(52) U.S. Cl.
CPC .................... *B23B 29/32* (2013.01)

(58) Field of Classification Search
CPC ....... B23B 29/03; B23B 29/04; B23B 29/043; B23B 29/046; B23B 29/06; B23B 29/08; B23B 29/10; B23B 29/12; B23B 29/14; B23B 29/22; B23B 2205/04; B23B 2205/12; B23B 2240/00; B23B 2240/36; B23B 2240/04; B23B 2270/08; B23B 2270/09

See application file for complete search history.

(56) References Cited

U.S. PATENT DOCUMENTS

| 1,522,587 | A | * | 1/1925 | Hallstrom | B23B 27/16 407/101 |
| 3,296,683 | A | * | 1/1967 | Kaiser | B23B 27/08 407/92 |
| 3,551,977 | A | * | 1/1971 | Novkov | B23B 29/043 D15/138 |
| 3,686,729 | A | * | 8/1972 | Cochran | B23B 27/04 407/85 |

(Continued)

FOREIGN PATENT DOCUMENTS

| DE | 2250332 A1 | 6/1973 |
| EP | 2 208 562 A1 | 7/2010 |

(Continued)

*Primary Examiner* — Nicole N Ramos
(74) *Attorney, Agent, or Firm* — Studebaker Brackett PLLC

(57) ABSTRACT

The present invention can realize better cutting performance while suppressing an influence of, for instance, deflection of a head and an increase in a moment acting on a fastening mechanism even when a cutting insert of a long total length is used. A shank of a head replaceable type cutting tool includes: a fastening mechanism that is formed at a leading end part in a longitudinal direction of the shank, and attaches a head; and a recessed part that is formed at the leading end part so as to accommodate a part of a cutting insert held by the head and avoid an interference with the cutting insert. The recessed part may be provided to accommodate a non-use part of the cutting insert held by the head in a state where the head is attached to the leading end part, and avoid an interference with the cutting insert.

11 Claims, 12 Drawing Sheets

(56) References Cited

U.S. PATENT DOCUMENTS

| | | | | |
|---|---|---|---|---|
| RE28,518 E | * | 8/1975 | Stein | B23B 27/04 |
| | | | | 407/117 |
| 4,137,000 A | * | 1/1979 | Takacs | B23B 27/04 |
| | | | | 407/107 |
| 4,509,886 A | * | 4/1985 | Lindsay | B23B 27/04 |
| | | | | 407/107 |
| 5,004,379 A | * | 4/1991 | Little | B23B 27/065 |
| | | | | 407/115 |
| 5,873,682 A | * | 2/1999 | Tripsa | B23B 31/1075 |
| | | | | 407/89 |
| 6,758,637 B2 | * | 7/2004 | Gati | B23B 27/08 |
| | | | | 407/92 |
| 6,960,049 B2 | * | 11/2005 | Inayama | B23B 27/08 |
| | | | | 407/103 |
| 9,079,252 B2 | * | 7/2015 | Hecht | B23B 27/04 |
| 9,901,986 B2 | * | 2/2018 | Makhlin | B23B 27/1622 |
| 2010/0254774 A1 | | 10/2010 | Hecht | |
| 2013/0034393 A1 | | 2/2013 | Hecht | |
| 2014/0348601 A1 | * | 11/2014 | Hecht | B23B 27/1622 |
| | | | | 407/66 |
| 2020/0254530 A1 | | 8/2020 | Flottorp et al. | |
| 2022/0001458 A1 | | 1/2022 | Rabouh et al. | |

FOREIGN PATENT DOCUMENTS

| | | |
|---|---|---|
| GB | 1 370 035 A | 10/1974 |
| JP | S49-112273 A | 10/1974 |
| JP | H06-155110 A | 6/1994 |
| JP | 2007-203379 A | 8/2007 |
| JP | 3154595 U | 10/2009 |
| JP | 2012-522651 A | 9/2012 |
| JP | 2014-524357 A | 9/2014 |
| JP | 2020-028943 A | 2/2020 |
| JP | 2020-533188 A | 11/2020 |
| WO | 2015/110985 A1 | 7/2015 |

* cited by examiner

SHANK AND CUTTING TOOL HAVING THE SHANK

BACKGROUND

Field

The present invention relates to a shank and a cutting tool including this shank.

Description of Related Art

Regarding a head replaceable type cutting tool adopting a structure in which a head that holds an insert is removably fastened to a leading end part of a shank, there are proposed a technique related to a structure for detaching a head in a state where a shank is attached to a machine tool such as a blade rest, and a technique related to a mechanism of fastening a head and a shank. Furthermore, for a head replaceable type cutting tool, there is conventionally proposed a technique that has been conceived from a viewpoint of improvement of operability for enabling quick replacement of a cutting insert, and realization of cost reduction by measuring a blade tip position in a state, where a cutting insert is dismounted from a machine tool, and reducing an arrangement time (see, for example, Patent Publications JP 2020-28943A, JP 2020-533188A, JP 2014-524357A, and JP 2012-522651A).

Furthermore, a cutting tool may be used in a scene that a cutting insert (chip) having a long total length is required, hence there is also proposed a technique related to a structure or the like for holding such a cutting insert (see Patent Publications JP 2007-203379A and JP H06-155110A).

SUMMARY

However, conventional head replaceable type cutting tools do not assume fastening a cutting insert having a longer total chip length (that is, for example, in a case of a cutting insert having a pair of cutting edges, a length from a leading end of one cutting edge to a leading end of another cutting edge) than a difference (referred to as a "projection amount of a head from a shank" below) between a total head length and a length of a fastening mechanism (an attachment/detachment pin for attaching and detaching the head to and from the shank) in a longitudinal direction of the shank. Generally, in a case of a small cutting tool or the like having a small width, if a fastening mechanism cannot be shifted in a direction apart from an insert, the insert and the fastening mechanism interfere with each other. In this regard, the conventional techniques have had no option but to increase an effective head length as a method for separating a fastening mechanism and a cutting insert so as not to interfere with each other. In other words, in a case where a cutting insert of a long total chip length is used as described, the conventional cutting tools have had no option but to set a longer projection amount of a head from a shank than the total length of the cutting insert. However, the conventional head replaceable type cutting tools each employ a configuration where only the shank contacts the blade rest, and the fastening mechanism alone accepts a force applied to the head, and therefore an increase in the projection amount of the head from the shank increases a distance between a cutting point and the fastening mechanism, and the force applied to the fastening mechanism influences cutting performance, which significantly affect the cutting performance.

It is therefore an object of the present invention to provide a shank and a cutting tool including the shank that are able to realize better cutting performance while suppressing an influence of, for instance, deflection of a head and an increase in a moment acting on a fastening mechanism even when a cutting insert of a long total length is used.

An aspect of the present invention is a shank of a head replaceable type cutting tool that includes: a fastening mechanism that is formed at a leading end part in a longitudinal direction of the shank, the fastening mechanism is configured to attach a head; and a recessed part that is formed at the leading end part so as to accommodate a part of a cutting insert held by the head and avoid an interference with the cutting insert.

According to the above shank, it is possible to attach to the shank the head to which the cutting insert having a longer total chip length than a projection amount of the head from the shank (i.e., a difference between a total head length and a length of the fastening mechanism in the longitudinal direction of the shank) has been attached. That is, although part of a cutting edge of a cutting insert held by such a head conventionally interferes with a fastening mechanism and a shank, the shank according to this aspect can avoid occurrence of an interference by accommodating part of such a cutting insert in the recessed part. Consequently, although a projection amount of the head from the shank conventionally needs to be set longer than a total length of the cutting insert, it is possible to attach the head to the shank without making such settings according to this aspect. Thus, since the head can be attached to the shank without increasing the projection amount of the head from the shank, it is not necessary to increase a distance between a cutting point and the fastening mechanism, so that, even when the cutting insert of the long total length is used, it is possible to suppress an influence due to deflection of the head and an increase in a moment acting on the fastening mechanism.

The above shank has a generally cuboid shape of which lateral cross-sectional shape perpendicular to the longitudinal direction of the shank is a rectangular shape, the fastening mechanism may be provided at the leading end part in the longitudinal direction of the shank, the fastening mechanism being a mechanism for attaching and detaching the head, and including an attachment/detachment operation part capable of performing an operation of attaching or detaching the head in a direction substantially perpendicular to the longitudinal direction, and the recessed part may be provided having a shape on a first reference face, the shape being recessed from the first reference face with a difference in height that is smaller than a width of the first reference face and has a value larger than 10% of the width of the first reference face, and the first reference face being on an opposite side to an operation face, which is provided with the attachment/detachment operation part, among side surfaces of the shank.

According to the above shank, the recessed part may be provided so as to accommodate a non-use part of the cutting insert held by the head in a state where the head is attached to the leading end part, and avoid an interference with the cutting insert.

According to the above shank, a side surface, which is provided with the operation face, among the side surfaces of the shank may have a stepped shape, and a stepped part that forms the stepped shape may be provided closer to a base end part along the longitudinal direction than a stepped part formed between the first reference face and the recessed part.

According to the above shank, the operation face may be a plane that continuously extends over a total length of the shank.

According to the above shank, an interval between the operation face and the first reference face may be larger than the width of the first reference face.

According to the above shank, a head attachment/detachment hole of the fastening mechanism for attaching and detaching the head may be offset and disposed in a direction farther from the recessed part than from a central axis of the shank extending in the longitudinal direction.

According to the above shank, a rib may be formed at the recessed part.

According to the above shank, the rib may be formed on one of both sides of the recessed part in a width direction of the first reference face.

According to the above shank, the rib may be formed on both sides of the recessed part in a width direction of the first reference face.

A cutting tool according to an aspect of the present invention includes the above shank.

DETAILED DESCRIPTION

Figure 1:
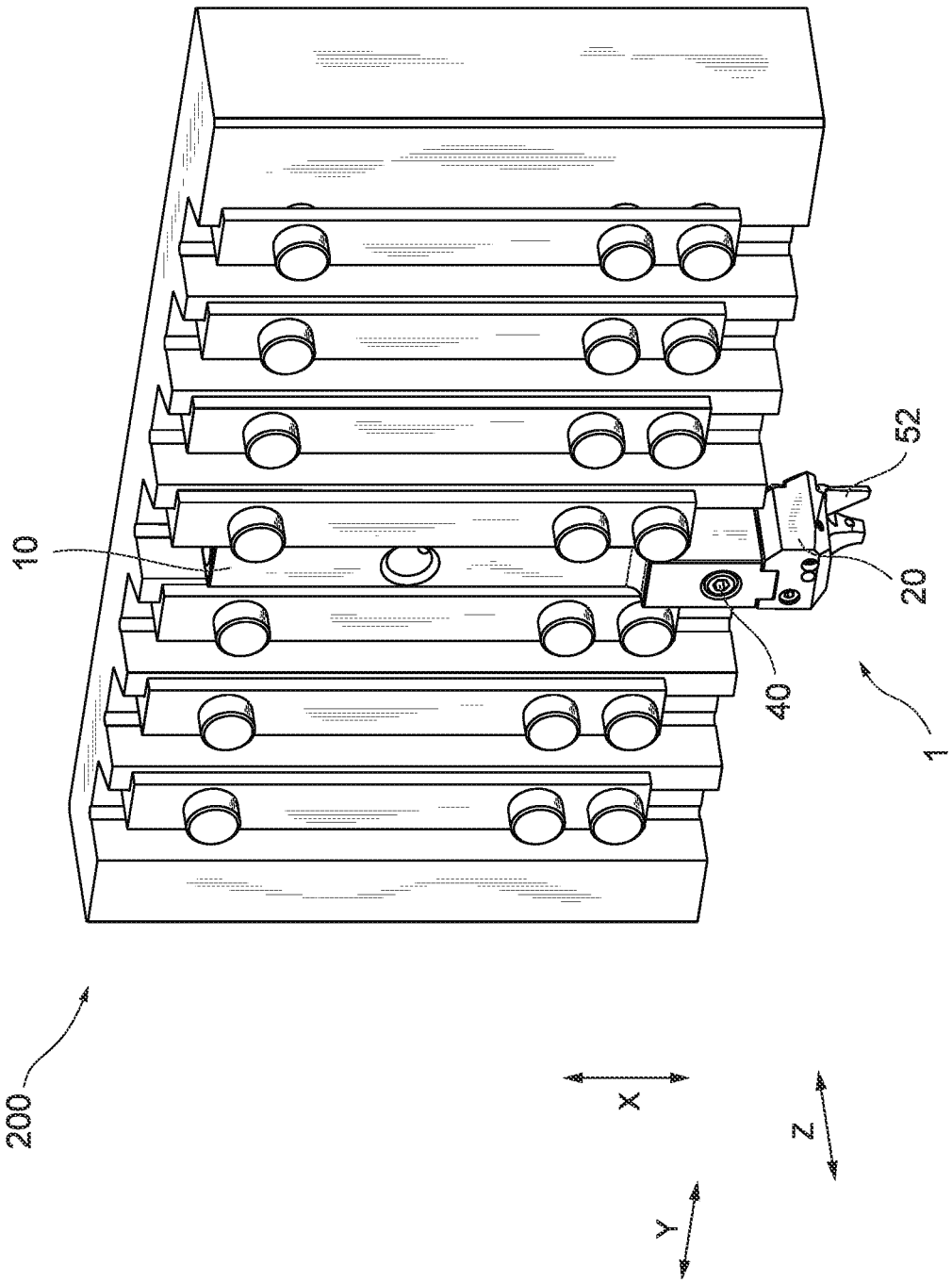
FIG. 1 is a perspective view illustrating a blade rest to which a cutting tool is attached according to an embodiment of the present invention.

A preferred embodiment of a shank 10 and a head replaceable type cutting tool (also referred to simply as a cutting tool below) 1 including this shank 10 according to the present invention will be described in detail below with reference to the drawings (see, for example, FIG. 1).

First Embodiment

The head replaceable type cutting tool 1 is configured as a tool for cutting into a workpiece (not illustrated) by feeding a cutting edge 52 of a cutting insert 50 at a time of machining using an automatic lathe (not illustrated) or the like. In this regard, the automatic lathe that automatically performs lathe work turns a workpiece by moving the cutting tool 1 along a direction (an axis perpendicular to a Z axis is conveniently referred to as an X axis in the present embodiment) perpendicular to the cutting tool 1 while feeding the long workpiece in a predetermined direction (that is a Z axis direction in the present embodiment), and cuts out a three-dimensional shape (see FIGS. 1 and 2). Furthermore, a plurality of types of the heat replaceable type cutting tools 1 are disposed as a "gang type" on a blade rest 200, the blade rest 200 is moved in an X axis direction or a Y axis direction perpendicular to both of the X axis direction and the Z axis direction according to a mode of lathe turning, and the cutting insert 50 is appropriately selected, moved and replaced to perform predetermined machining (see FIGS. 1 and 2).

Figure 7:
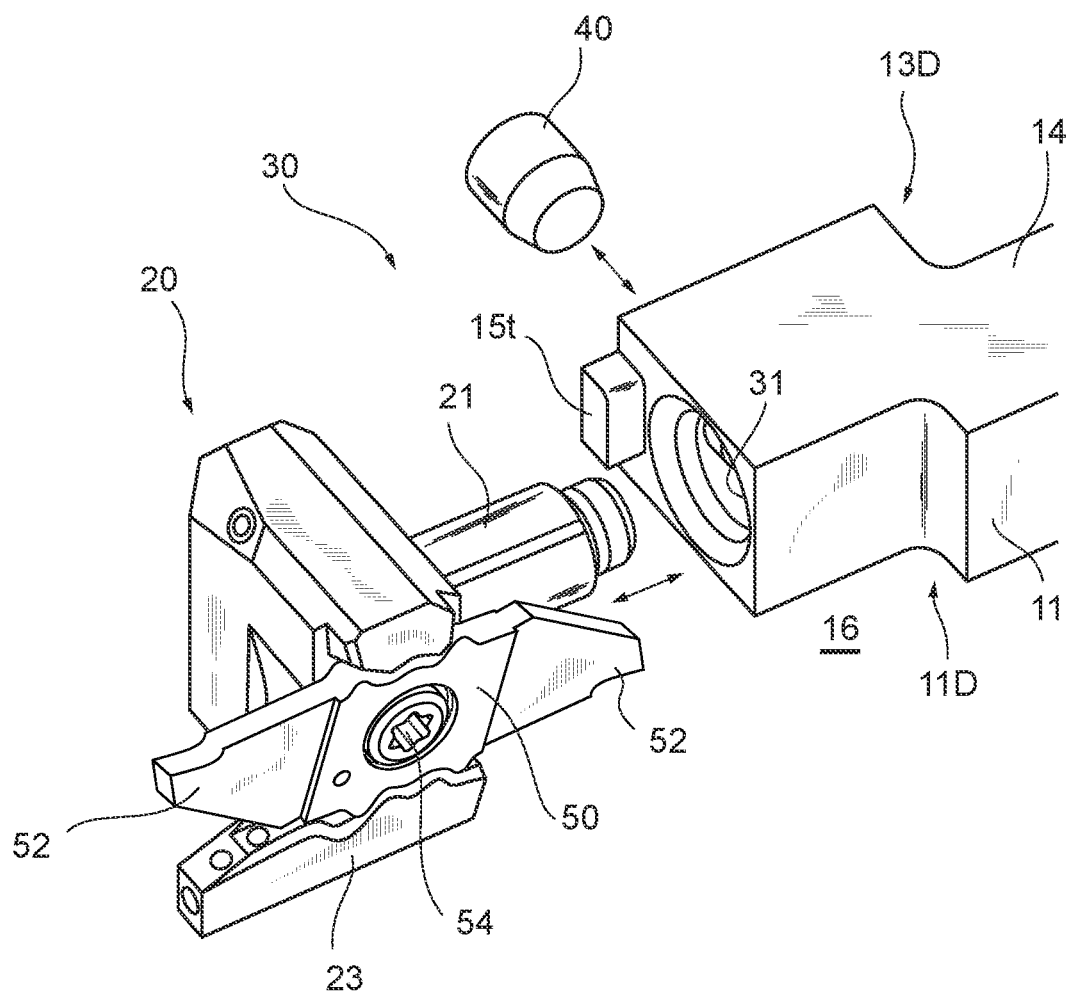
FIG. 7 is a perspective view illustrating an enlarged leading end part of the shank and head detached from the shank.

The cutting tool 1 according to the present embodiment used for such lathe turning is a head replaceable type cutting tool that enables attachment and detachment of a head 20 to and from the shank 10, and include these shank 10 and head 20, and, in addition, a fastening mechanism 30 for attaching the head 20 to the shank 10 (see, for example, FIG. 7).

Figure 2:
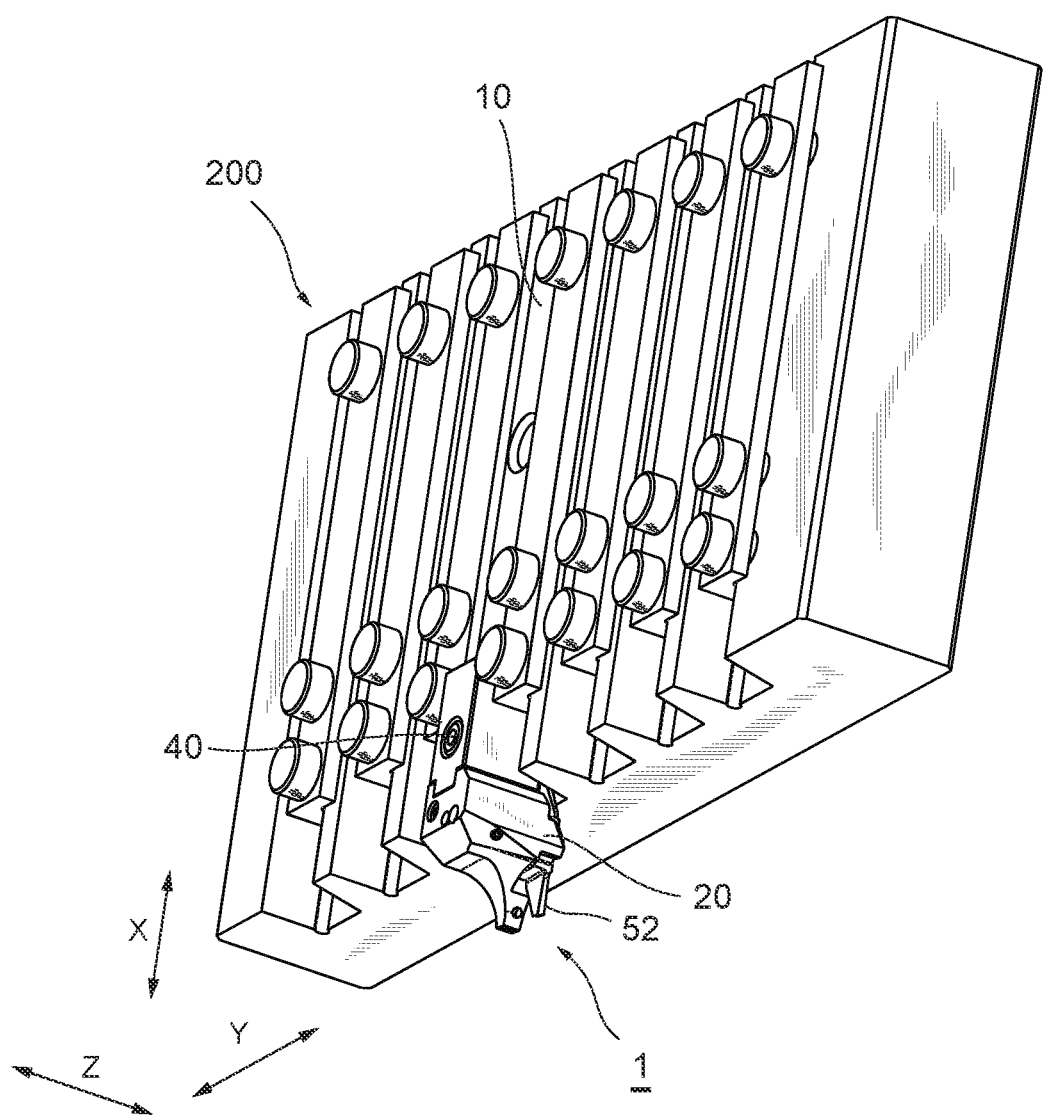
FIG. 2 is a perspective view illustrating the blade rest from another angle.
Figure 3:
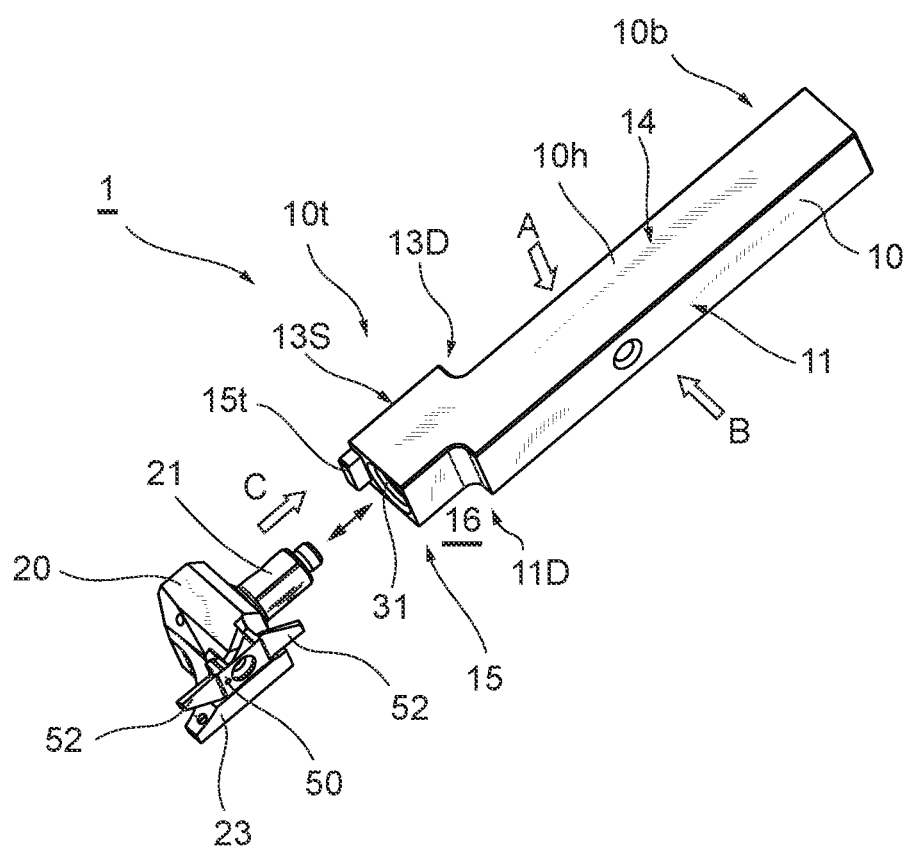
FIG. 3 is a perspective view illustrating the cutting tool in a state where a head is detached from a shank.

The shank 10 is formed so as to be attached to the blade rest 200 in a state where a grip target part (a main body part whose lateral cross section is uniform in the shank 10 according to the present embodiment) 10h of the shank is gripped (see, for example, FIGS. 1 to 3). In an example, the shank 10 according to the present embodiment has a generally cuboid shape whose lateral cross-sectional shape perpendicular to a longitudinal direction (a direction that matches with the above-described X axis direction) along a central axis 10X (see, for example, FIG. 6B) of the shank 10 is a rectangular shape (see, for example, FIGS. 6A to 6C).

Figure 8:
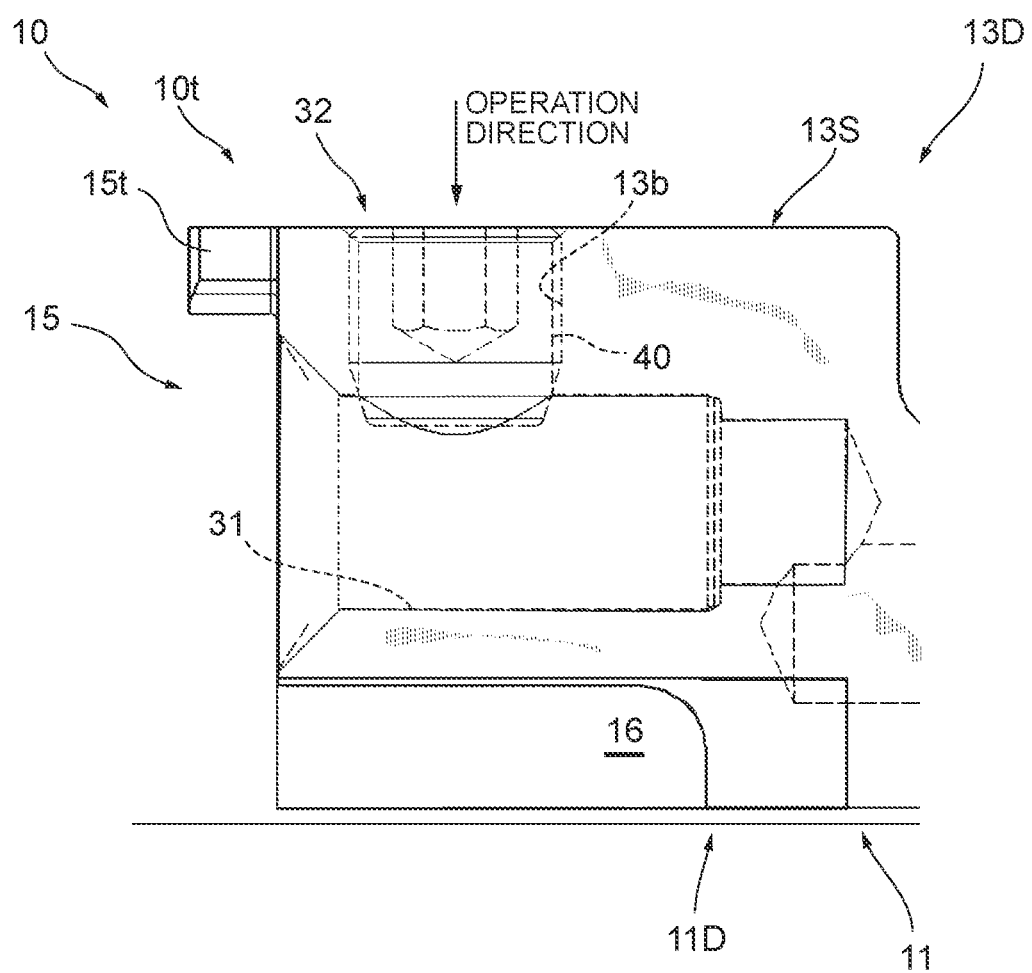
FIG. 8 is a view illustrating the leading end part of the shank seen from the direction A in FIG. 3.

Hereinafter, for ease of description, four side surfaces of the shank 10 are respectively defined as follows in the present embodiment. First, a face seen from a direction denoted by symbol B in FIG. 3 is a "first reference face", and is denoted by reference numeral 11 (see, for example, FIGS. 3 and 6B). This first reference face 11 is a face that functions as a reference face (attachment face) for positioning the shank 10 in a Z direction when the shank 10 is attached to the blade rest 200 (see FIGS. 1 and 2). A width (also referred to as a shank height) of the first reference face 11 is denoted by symbol SH (see, for example, FIGS. 3 and 6B). Furthermore, a face seen from a direction denoted by symbol A in FIG. 3 is a "fourth face", and is denoted by reference numeral 14 (see, for example, FIGS. 3 to 6B). A face on an opposite side to this fourth face 14 is a "second reference face", and is denoted by reference numeral 12 (see, for example, FIG. 6B). This second reference face 12 functions as a reference face (attachment face) for positioning the shank 10 in a Y direction when the shank 10 is attached to the blade rest 200 (see FIGS. 1 and 2). Furthermore, a face on an opposite side to the first reference face 11 is denoted by reference numeral 13 as a "third side surface", and, in a case where the third side surface 13 includes a stepped part 13D, a face of the third side surface 13 provided with a screw hole 13*b* for a fastening screw 40 in particular is referred to as an "operation face", and is denoted by reference numeral 13S (see, for example, FIG. 6A). The operation face 13S allows an operation for attaching and detaching the head 20 by turning the fastening screw 40 from the operation face 13S side (see FIGS. 8 and 9. The screw hole 13*b* constitutes part of an attachment/detachment operation part 32 of the fastening mechanism 30 for attaching and detaching the head 20 to and from the shank 10.

At a leading end part 10*t* of the shank 10, an attachment part 15 and a recessed part 16 are formed (see, for example, FIG. 3). The attachment part 15 is a part to which the head 20 is attached using the fastening mechanism 30. The attachment part 15 is provided with a head attachment/detachment hole 31 in which an attachment/detachment pin 21 of the head 20 can be inserted (see, for example, FIG. 3). Furthermore, the attachment part 15 is provided with a projected part 15*t* that uniquely defines a direction of the head 20 when the projected part 15*t* fits to a predetermined recessed part (not illustrated) of the head 20 to be attached (see, for example, FIGS. 3 and 6A).

Figure 4:
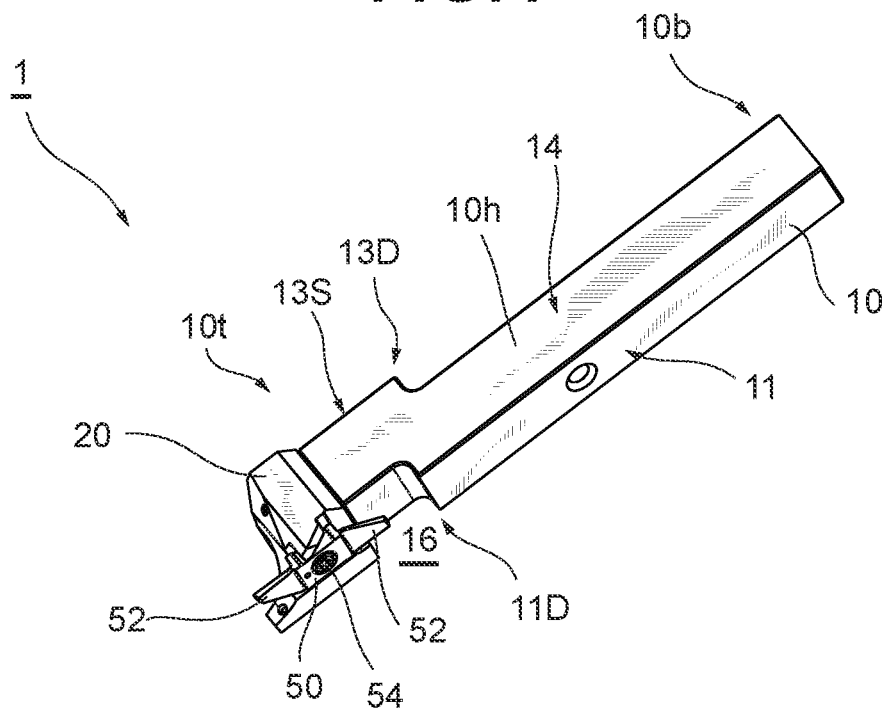
FIG. 4 is a perspective view illustrating the cutting tool in a state where the head is attached to the shank.

The recessed part 16 is formed at the leading end part 10*t* of the shank 10 so as to accommodate part of the cutting insert 50 held by the head 20, and avoid an interference with the cutting insert 50 (see, for example, FIG. 4). For example, the recessed part 16 of the head replaceable type cutting tool 1 according to the present embodiment that uses the cutting insert 50 including the pair of cutting edges 52 is provided to accommodate a non-use part (that is a side including the cutting edge 52 that is not used for cutting) of the cutting insert 50 held by the head 20 in a state where the head 20 is attached to the leading end part 10*t* of the shank 10, and avoid the interference with the cutting insert (see, for example, FIGS. 4 and 9). The recessed part 16 according to the present embodiment is formed by a stepped part 11D (a size of a height in difference of the stepped part 11D is denoted by symbol DH in FIG. 6A) by cutting out part on the first reference face 11 side of the shank 10 (see FIG. 6A). Although the shape of the recessed part 16 and the difference in height DH of the stepped part 11D are not limited in particular, the recessed part 16 is formed in the present embodiment such that the recessed part 16 has a shape that is recessed from the first reference face 11 with the difference in height DH that is smaller than the width (shank width) SH of the first reference face 11 and takes a value larger than 10% of the width (shank width) SW of the first reference face 11 (see, for example, FIG. 6A). That is, the difference in height DH is appropriately set by taking into account that the difference in height DH preferably has a size (depth) that can accommodate an entire width of the cutting insert 50, yet there is a case where the difference in height DH can accommodate only part of the width of the cutting insert 50 in a case where the difference in height DH is 10% of the width SW or less, and, on the other hand, it is concerned that too large a DH value is excessive for a purpose of accommodating the cutting insert 50, and rigidity of the shank 10 lowers.

Furthermore, the shank 10 has a stepped shape in which the stepped part 13D is provided to the third side surface 13 as described above (see, for example, FIG. 6A). Although a position of the stepped part 13D in the longitudinal direction (a direction along the central axis 10X) of the shank 10 is not limited in particular, for example, the stepped part 13D is provided closer to a base end part 10*b* along the longitudinal direction than the stepped part 11D formed between the first reference face 11 and the recessed part 16 in the present embodiment (see, for example, 6A). While the shank 10 according to the present embodiment has a crank shape near the leading end part 10*t* seen from the second reference face 12 or the fourth face 14 (see, for example, FIG. 6A), the step 13D is provided at the above-described position, and consequently a width in the middle of the crank shape part does not narrow too much, so that it is possible to form the predetermined crank shape near the leading end part 10*t* while securing the required rigidity of the shank 10.

The head 20 is a member that is formed removably from the leading end part 10*t* of the shank 10. The head 20 according to the present embodiment is formed as a member that includes the attachment/detachment pin 21, an insert mounting seat 22, and a retainer part 23 (see, for example, FIG. 7). The attachment/detachment pin 21 is a pin having a length LP that can be inserted in the head attachment/detachment hole 31 of the shank 10 (see FIG. 9), and is fixed by retaining a side part of the attachment/detachment pin 21 by the fastening screw 40 in a state where the attachment/detachment pin 21 is inserted in the head attachment/detachment hole 31. The insert mounting seat 22 is a base for mounting the cutting insert 50 with a mounting screw 54, and is provided to a side part of the head 20 that faces the first reference face 11 side of the shank 10 (see, for example, FIGS. 7 and 9). The cutting insert 50 including the pair of cutting edges 52 can be mounted on this insert mounting seat 22. The retainer part 23 is provided near the insert mounting seat 22 to retain the cutting insert 50 (see, for example, FIG. 7). A projection amount HE of the head 20 from the shank 10 in the head replaceable type cutting tool 1 according to the present embodiment is a length along an axial direction from a leading end face of the attachment part 15 of the shank 10 to a leading end pat of the retainer part 23, in other words, a length (HE=LH−LP) obtained by subtracting a length LP of the attachment/detachment pin 21 from a total length LH of the head 20 (see FIG. 9). Note that the cutting insert 50 can be replaced with various types, and therefore description related to the head 20 is made herein.

The fastening mechanism 30 is a mechanism for attaching the head 20 to the leading end part 10*t* of the shank 10, and includes, for example, the attachment/detachment pin 21 of the head 20, the head attachment/detachment hole 31, the attachment/detachment operation part 32, and the like. The head attachment/detachment hole 31 is provided at the attachment part 15 at the leading end part 10*t* of the shank 10 such that the attachment/detachment pin 21 of the head 20 can be inserted in the head attachment/detachment hole 31 (see, for example, FIG. 3). The attachment/detachment operation part 32 is a part for performing an operation to attach and detach the head 20, and, more specifically, includes the screw hole 13*b* and the fastening screw 40 to be screwed to the screw hole 13*b* (see, for example, FIG. 7). According to the head replaceable type cutting tool 1 according to the present embodiment, it is possible to attach and detach the head 20 by performing an operation of screwing or unscrewing the fastening screw 40 in a substantially perpendicular direction to the longitudinal direction (the direction of the central axis 10X) of the shank 10. Note that a position of the head attachment/detachment hole 31 is not limited in particular, and may be disposed at a position matching with the central axis 10X of the shank 10 or may be disposed at a position displaced therefrom. In the present embodiment, the head attachment/detachment hole 31 is disposed at a position offset in a direction (in other words, a direction to approach the operation face 13S) farther from the recessed part 16 than from the central axis 10X (see, for example, FIG. 8). In a case where the head attachment/detachment hole 31 is offset in this way, there is a pad at a part near the recessed part 16 at the leading end part 10t of the shank 10, so that it is easy to avoid an event that formation of the recessed part 16 forms a thin thickness part.

The above head replaceable type cutting tool 1 can be used as a structure (assembly) that includes the shank 10, the head 20, and the fastening mechanism 30 for attaching the head 20 to the shank 10. Upon actual use, the shank 10 is fixed to the blade rest 200 such as a gang type by a jig, the head 20 is fixed to the shank 10 using the fastening mechanism 30, the cutting insert 50 is mounted on the insert mounting seat 22 of the head 20, and then the cutting edge 52 is caused to cut into a rotating workpiece (cutting target member) to cut (see, for example, FIGS. 1 and 2).

Figure 9:
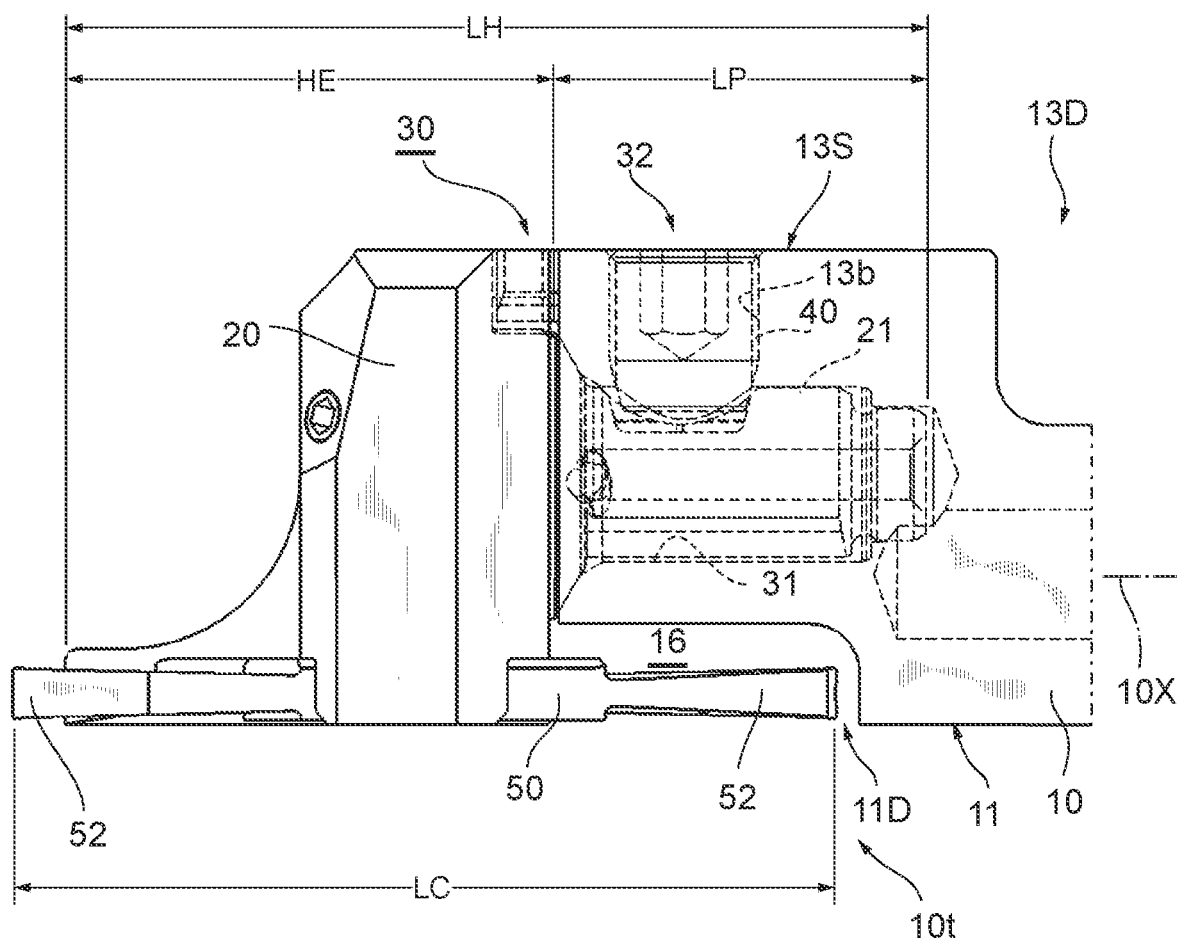
FIG. 9 is a view illustrating a state where the head is attached to the leading end part of the shank illustrated in FIG. 8.
Figure 14:
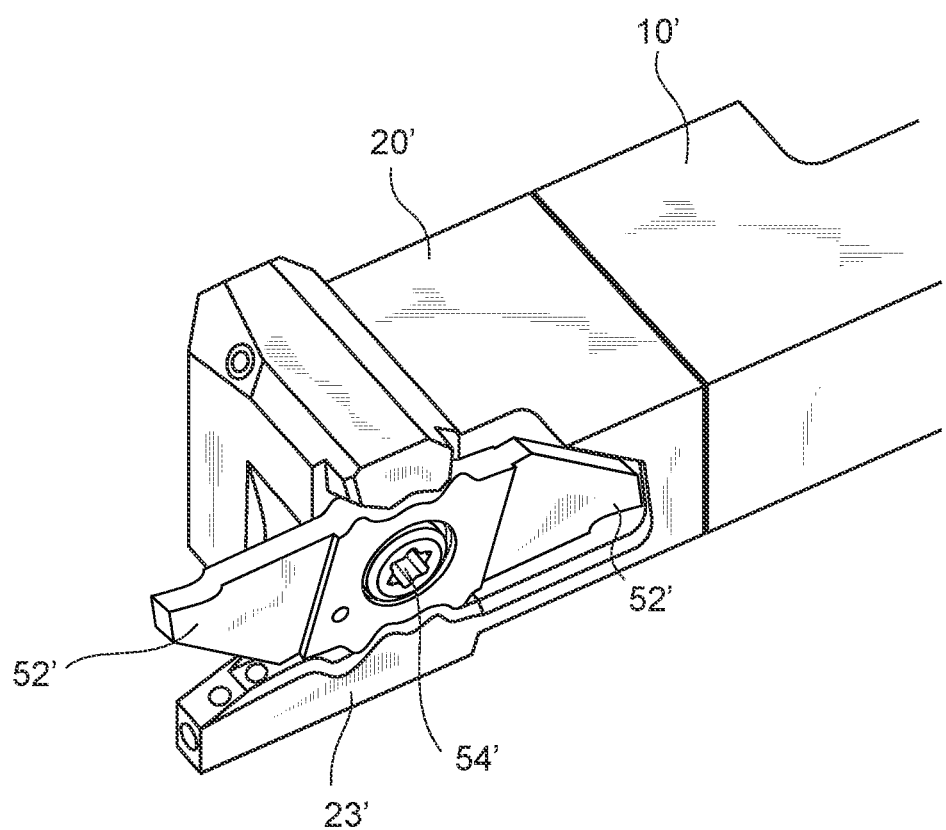
FIG. 14 is a perspective view illustrating an example of a conventional cutting tool as a reference example for comparison with FIG. 13.

According to this head replaceable type cutting tool 1 and the shank 10 that constitutes the head replaceable type cutting tool 1, the total tip length (that is the length along the central axis 10X of the shank 10 from the leading end of the one cutting edge 52 to the leading end of the other cutting edge 52 in a case of the cutting insert 50 including the pair of cutting edges 52 as in the present embodiment, and is denoted by symbol LC in FIG. 9) can suppress deflection of the head 20 and an increase in a moment acting on the fastening mechanism 30 even when the relatively long cutting insert 50 is used, and realize better cutting performance. In a case where, for example, the cutting insert 50 of the long total tip length LC is used, simply increasing a total head length to meet the total tip length LC as in the conventional techniques, and providing to the head a recessed part for accommodating a non-use part of a cutting edge increase a projection amount of the head from a shank, and a length from a fastening mechanism to a cutting point (cutting edge 52) increases accompanying this increase, and, as a result, deflection of the head and a moment acting on the fastening mechanism increase, which may influence cutting performance (see FIG. 14. Note that part of corresponding reference numerals in FIG. 14 are illustrated by assigning dashes (') thereto). In this regard, the head replaceable type cutting tool 1 according to the present embodiment, and the shank 10 of the head replaceable type cutting tool 1 employ a configuration where the recessed part 16 is provided to the shank 10 instead of the head 20, so that it is possible to avoid occurrence of an interference by accommodating part of the cutting insert 50 in this recessed part 16. Consequently, while the conventional techniques have had no option but to set a longer projection amount in a shank longitudinal direction of the head from the shank than the total length of the cutting insert, according to the present embodiment, it is possible to attach the head 20 to the shank 10 without making such settings, in other words, it is possible to attach the head 20 to the shank 10 without increasing the projection amount HE along the shank longitudinal direction of the head 20 from the shank 10. This means that it is not necessary to increase a distance between the cutting point and the fastening mechanism 30, so that, even when the cutting insert 50 of the long total length is used, it is possible to suppress an influence due to deflection of the head 20 and an increase in a moment acting on the fastening mechanism 30. By reducing deflection of the head 20 or the like and a load on the fastening mechanism 30, it is also possible to make performance related to rigidity of the head replaceable type cutting tool 1 and the like closer to performance of a cutting tool of an integral type (that is not the head replaceable type, and is formed by a uniform metal member including a tip fastening part).

Second Embodiment

Figure 5:
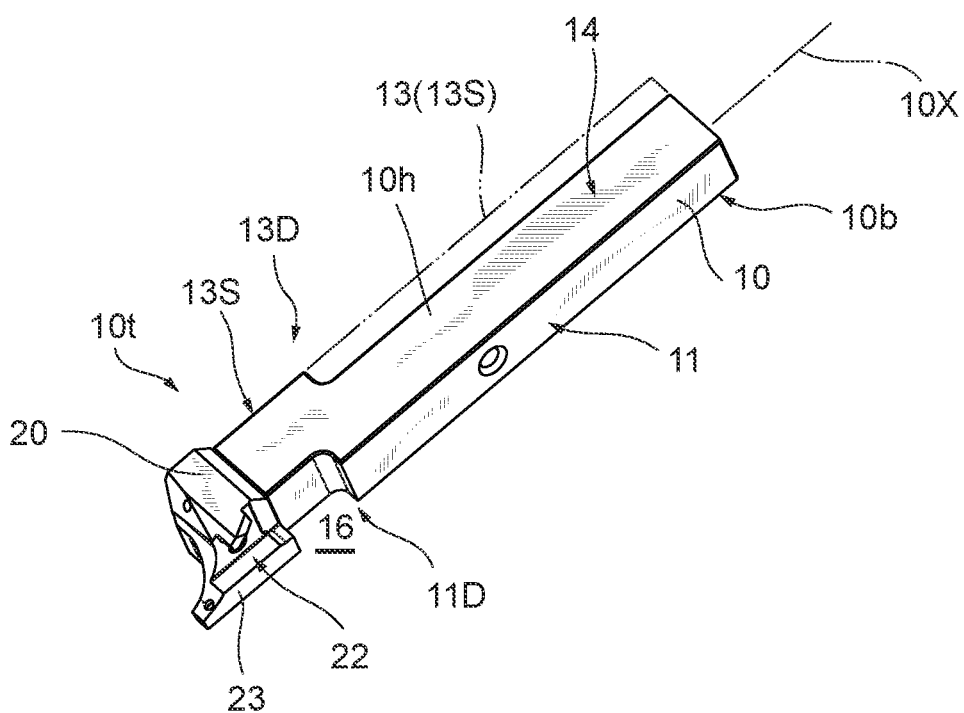
FIG. 5 is a perspective view of a state where a cutting insert is dismounted from the cutting tool illustrated in FIG. 4.
Figure 6A:
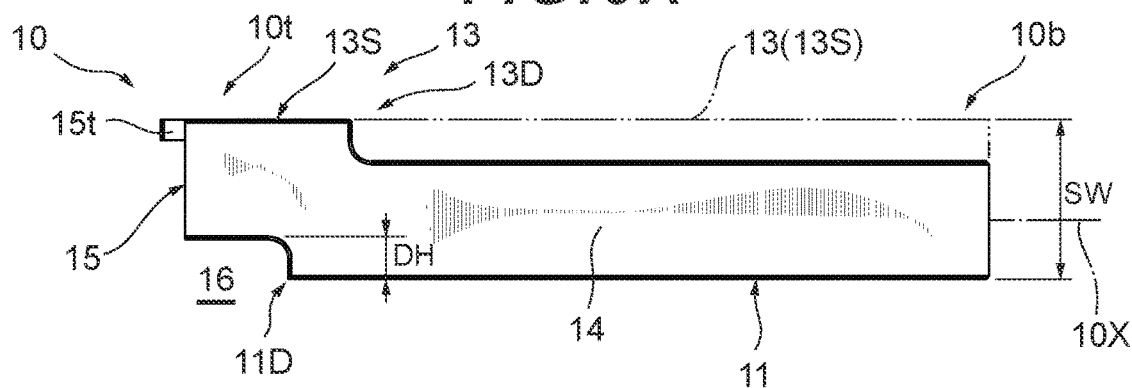
FIG. 6A is a view illustrating the shank seen from a direction A in FIG. 3.
Figure 6B:
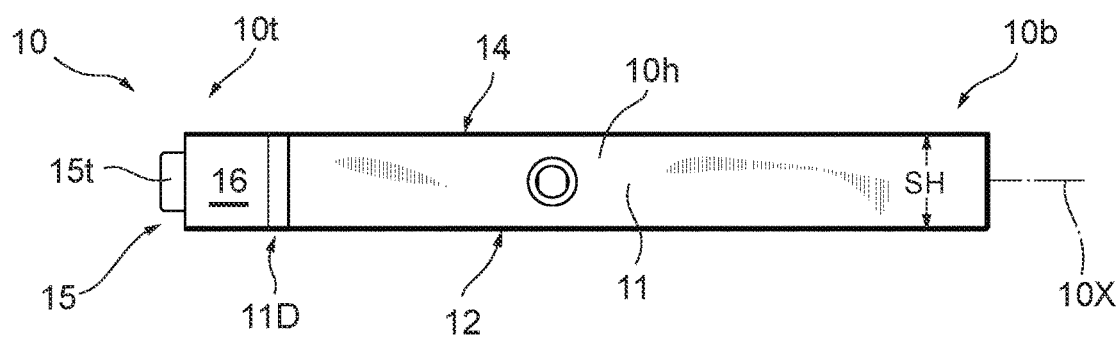
FIG. 6B is a view illustrating the shank seen from a direction B in FIG. 3.
Figure 6C:
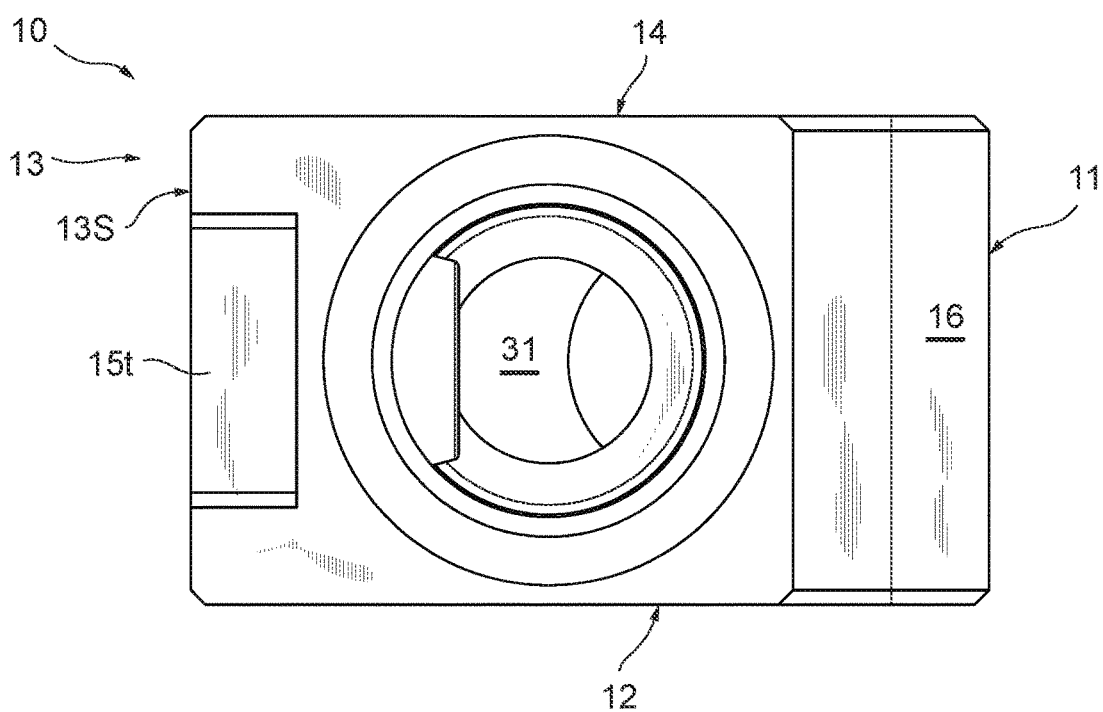
FIG. 6C is a view illustrating the shank seen from a direction C in FIG. 3.

According to the head replaceable type cutting tool 1 according to the present embodiment, the operation face 13S of the shank 10 is formed by the plane that continuously extends over the total length of the shank 10, and the entire operation face 13S formed by this plane is formed as namely the third side surface 13 (see virtual lines illustrated in FIGS. 5 and 6A). In other words, the shank 10 according to the present embodiment has a shape that is not provided with the stepped part (13D) on the third side surface. Furthermore, in the shank 10 according to the present embodiment, the interval (also referred to as the shank width) SW between the operation face 13S (third side surface 13) and the first reference face 11 is larger than the width (shank height) SH of the first reference face 11 (see FIGS. 6A and 6B). When the third side surface 13 is the above plane, a cross-sectional area of the shank 10 increases, so that rigidity improves. On a side note, in a case where the third side surface 13 is the above plane, the third side surface 13 may be a positioning reference face in the Z axis direction (see FIGS. 1 and 2) in place of the first reference face 11.

Third Embodiment

Figure 10:
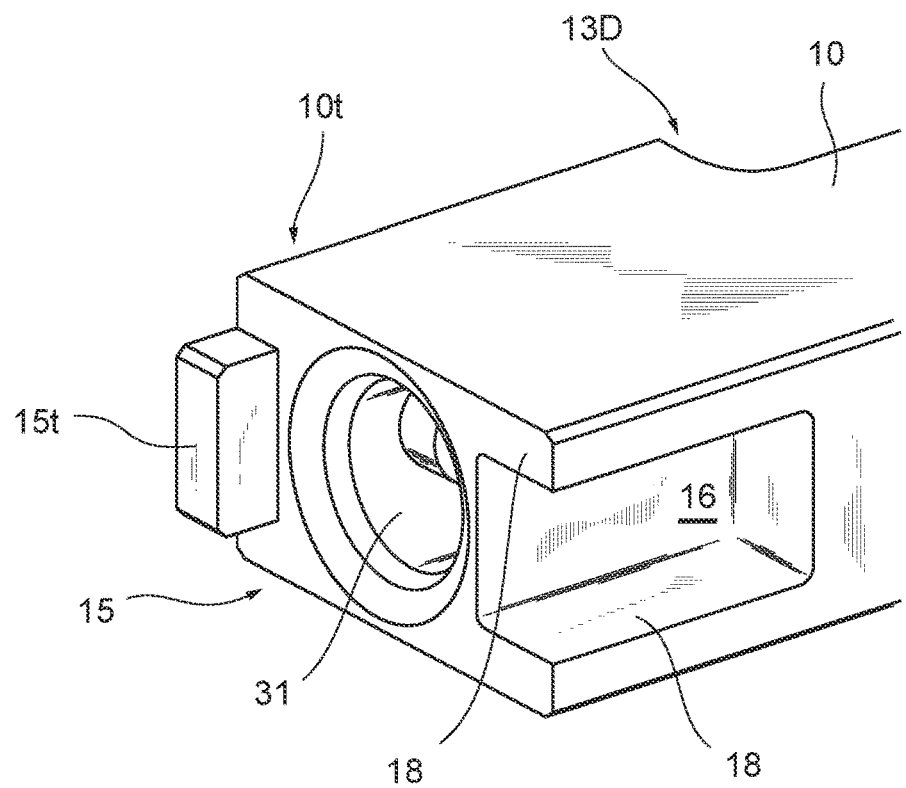
FIG. 10 is a perspective view illustrating an example of a shape of a recessed part at the leading end part of the shank.
Figure 11:
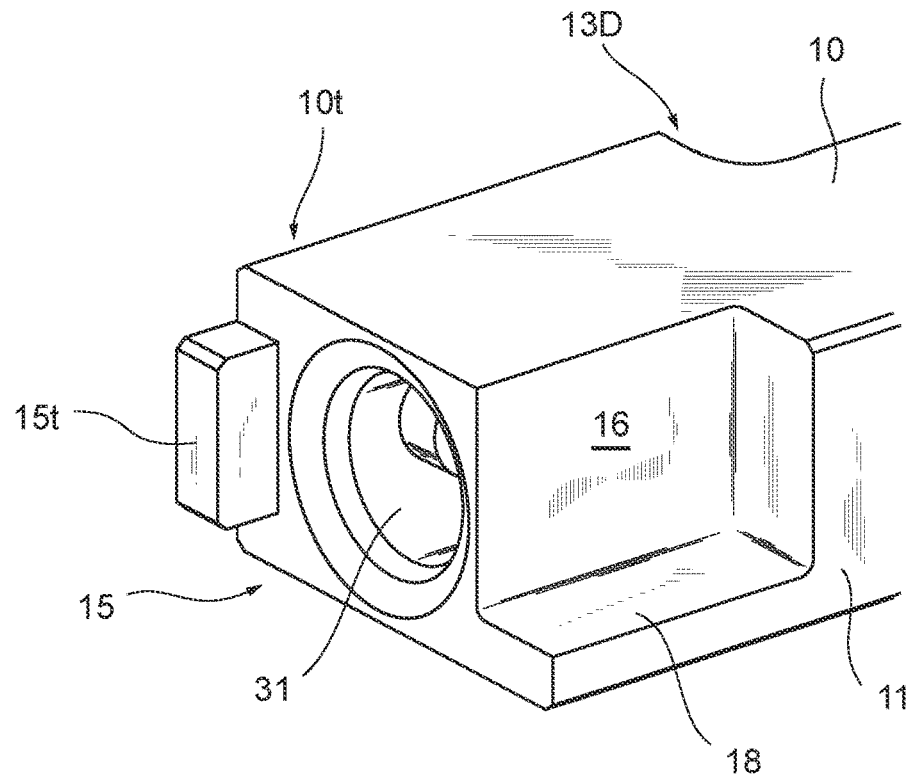
FIG. 11 is a perspective view illustrating another example of the shape of the recessed part at the leading end part of the shank.
Figure 12:
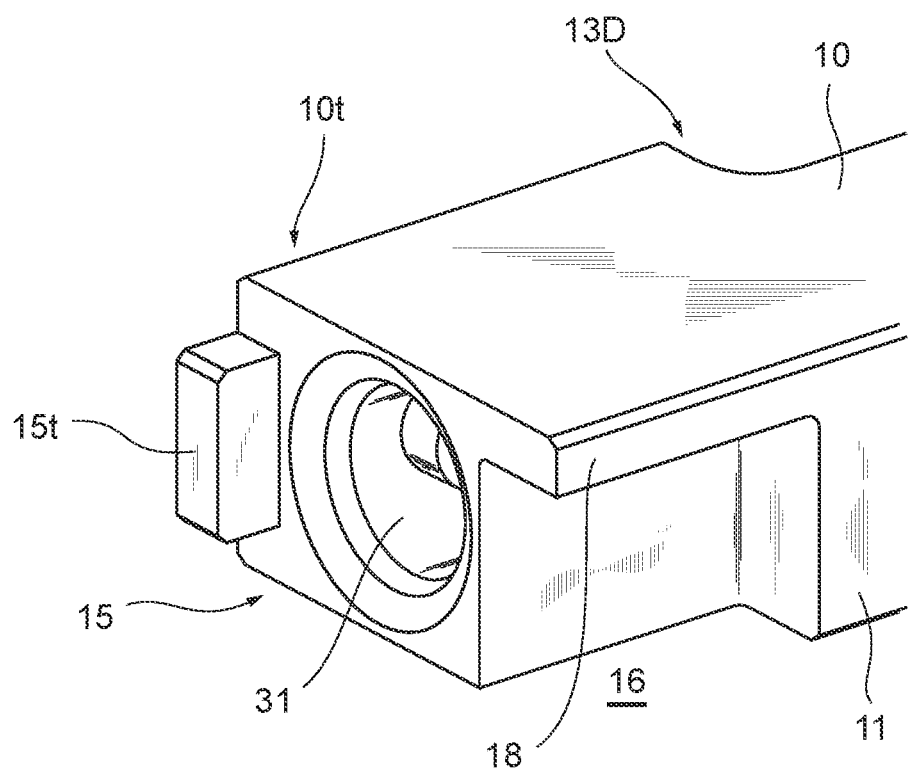
FIG. 12 is a perspective view illustrating still another example of the shape of the recessed part at the leading end part of the shank.
Figure 13:
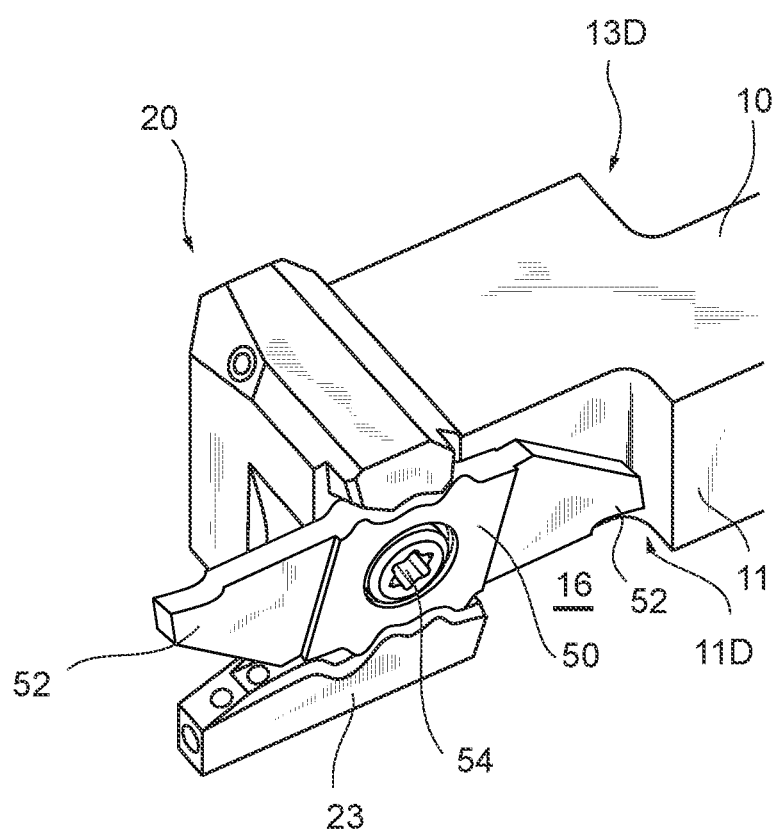
FIG. 13 is a perspective view illustrating a state where the head is attached to the leading end part of the shank illustrated in FIG. 7.

The shape of the recessed part 16 of the shank 10 of the head replaceable type cutting tool 1 may adopt various shapes and modes based on the tip shape (the shape of the cutting edge 52) of the cutting insert 50. Another aspect example of the recessed part 16 at which a rib 18 is formed will be described below as a third embodiment below (see FIGS. 10 to 12).

Under a condition that the cutting edge 52 on the non-use side of the cutting insert 50 does not cause an interference, the rib 18 may be formed at the recessed part 16. The rib 18 may be formed on both sides in a width direction (that is, in other words, a direction of the shank height SH and matches with the Y axis direction in a case where the shank 10 is attached to the blade rest 200) of the first reference face 11 (see FIG. 10), or may be formed only on one of the both sides (see FIGS. 11 and 12).

Note that the above-described embodiment is a preferred embodiment of the present embodiment, yet is not limited to this, and can be variously modified and carried out without departing from the spirit of the present invention.

The present invention is suitably applied to a shank for a cutting tool, or a head replaceable type cutting tool including the shank.

What is claimed is:

1. A shank of a head replaceable type cutting tool, the shank comprising:
   an attachment part to which a head is attached, the attachment part being located at a forwardmost end face of a leading end part in a longitudinal direction of the shank;
   a fastening mechanism located at the leading end part, the fastening mechanism being configured to attach the head to the attachment part; and
   a recessed part disposed at the leading end part so as to accommodate a part of a cutting insert held by an insert mounting seat of the head and avoid an interference with the cutting insert;
   wherein the attachment part and the leading end part of the shank are arranged such that an entirety of the insert mounting seat of the head is disposed forward of the forwardmost end face of the leading end part when the head is attached to the attachment part; and
   wherein an entirety of the recessed part is disposed rearward of the insert mounting seat of the head when the head is attached to the attachment part.

2. The shank according to claim 1, wherein
the shank has a cuboid shape of which a lateral cross-sectional shape perpendicular to the longitudinal direction of the shank is a rectangular shape,
the fastening mechanism is for attaching and detaching the head, and includes an attachment/detachment operation part capable of attaching or detaching the head in a direction substantially perpendicular to the longitudinal direction, and
the recessed part has a shape that is recessed from a first reference face, the shape being recessed from the first reference face by a distance smaller than a width of the first reference face and larger than 10% of a width of a face of the shank that is adjacent to and perpendicular to the first reference face, the first reference face being on an opposite side to an operation face which is provided with the attachment/detachment operation part, among side surfaces of the shank.

3. The shank according to claim 2, wherein the recessed part accommodates a non-use part of the cutting insert held by the head in a state where the head is attached to the leading end part, and avoids an interference with the cutting insert.

4. The shank according to claim 3, wherein a side surface, which is provided with the operation face, among the side surfaces of the shank has a stepped shape, and a stepped part that forms the stepped shape is provided closer to a base end part along the longitudinal direction than a stepped part formed between the first reference face and the recessed part.

5. The shank according to claim 2, wherein the operation face is a plane that continuously extends over a total length of the shank.

6. The shank according to claim 5, wherein a distance between the operation face and the first reference face is larger than the width of the first reference face.

7. The shank according to claim 2, wherein a head attachment/detachment hole of the fastening mechanism for attaching and detaching the head is offset and disposed in a direction farther from the recessed part than from a central axis of the shank extending in the longitudinal direction.

8. The shank according to claim 2, wherein a rib is formed at the recessed part.

9. The shank according to claim 8, wherein the rib is formed on one side of the recessed part in a width direction of the first reference face perpendicular to the longitudinal direction of the shank.

10. The shank according to claim 8, wherein the rib is formed on both sides of the recessed part in a width direction of the first reference face perpendicular to the longitudinal direction of the shank.

11. A cutting tool comprising the shank according to claim 1.

* * * * *